United States Patent
Nagata (10) Patent No.: US 12,202,494 B2
(45) Date of Patent: Jan. 21, 2025

(54) INFORMATION PROCESSING APPARATUS, METHOD, AND STORAGE MEDIUM

(71) Applicant: TOYOTA JIDOSHA KABUSHIKI KAISHA, Toyota (JP)

(72) Inventor: Yu Nagata, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 213 days.

(21) Appl. No.: 17/892,615

(22) Filed: Aug. 22, 2022

(65) Prior Publication Data

US 2023/0111630 A1 Apr. 13, 2023

(30) Foreign Application Priority Data

Oct. 7, 2021 (JP) .................. 2021-165727

(51) Int. Cl.
*B60W 50/02* (2012.01)
*G01M 17/007* (2006.01)
*G01N 17/00* (2006.01)

(52) U.S. Cl.
CPC ...... *B60W 50/0205* (2013.01); *G01M 17/007* (2013.01); *G01N 17/006* (2013.01); *B60W 2540/30* (2013.01); *B60W 2552/20* (2020.02); *B60W 2555/20* (2020.02)

(58) Field of Classification Search
CPC .......... G07C 5/006; G01M 17/007; B60W 50/0205; B60W 2552/15; B60W 2556/50; B60W 2555/20; B60W 2050/021; B60W 2540/30; B60W 2552/20; G01N 17/006
See application file for complete search history.

(56) References Cited

U.S. PATENT DOCUMENTS

| | | | |
|---|---|---|---|
| 9,315,178 B1 * | 4/2016 | Ferguson ................ | B60T 8/171 |
| 2020/0160348 A1 | 5/2020 | Osumi et al. | |
| 2020/0334922 A1 * | 10/2020 | Johnston .............. | G07C 5/0808 |
| 2021/0339763 A1 * | 11/2021 | Just ...................... | G07C 5/0816 |
| 2022/0016939 A1 * | 1/2022 | Doraiswamy .......... | G06N 3/084 |

FOREIGN PATENT DOCUMENTS

| | | |
|---|---|---|
| JP | 2015-041304 A | 3/2015 |
| JP | 2020-86611 A | 6/2020 |
| WO | 2016/071993 A1 | 5/2016 |
| WO | 2020/213024 A1 | 10/2020 |

\* cited by examiner

*Primary Examiner* — Stephen Holwerda
(74) *Attorney, Agent, or Firm* — Sughrue Mion, PLLC

(57) ABSTRACT

A control unit of an information processing apparatus acquires the number of times of operations or an operation time of an operation unit provided in a vehicle at a time at which the operation unit has operated, acquires surroundings information around the vehicle at the time at which the operation unit has operated, and calculates a wear degree of the operation unit by multiplying a wear coefficient which corresponds to surroundings indicated by the acquired surroundings information by the acquired number of times of operations or operation time.

12 Claims, 5 Drawing Sheets

INFORMATION PROCESSING APPARATUS, METHOD, AND STORAGE MEDIUM

CROSS-REFERENCE TO RELATED APPLICATION

This application claims priority to Japanese Patent Application No. 2021-165727 filed on Oct. 7, 2021, incorporated herein by reference in its entirety.

BACKGROUND

1. Technical Field

The present disclosure relates to an information processing apparatus, a method, and a storage medium.

2. Description of Related Art

Japanese Unexamined Patent Application Publication No. 2015-041304 (JP 2015-041304 A) discloses a technique for grasping a state of a vehicle after an elapse of a month and a year.

SUMMARY

There is room for improvement in the related art in appropriately grasping a wear degree of a vehicle part.

The present disclosure improves a technique for appropriately grasping a wear degree of a vehicle part.

An information processing apparatus according to a first aspect of the present disclosure includes a control unit. The control unit is configured to acquire the number of times of operations or an operation time of an operation unit provided in a vehicle at a time at which the operation unit operates, acquire surroundings information around the vehicle at the time at which the operation unit operates, and calculate a wear degree of the operation unit by multiplying a wear coefficient which corresponds to surroundings indicated by the acquired surroundings information by the acquired number of times of operations or operation time.

A method according to a second aspect of the present disclosure is executed by an information processing apparatus. The method includes acquiring the number of times of operations or an operation time of an operation unit provided in a vehicle at a time at which the operation unit operates, acquiring surroundings information around the vehicle at the time at which the operation unit operates, and calculating a wear degree of the operation unit by multiplying a wear coefficient which corresponds to surroundings indicated by the acquired surroundings information by the acquired number of times of operations or operation time.

A storage medium according to a third aspect of the present disclosure stores a program causing a computer to acquire the number of times of operations or an operation time of an operation unit provided in a vehicle at a time at which the operation unit operates, acquire surroundings information around the vehicle at the time at which the operation unit operates, and calculate a wear degree of the operation unit by multiplying a wear coefficient which corresponds to surroundings indicated by the acquired surroundings information by the acquired number of times of operations or operation time.

With each aspect of the present disclosure, it is possible to improve a technique for appropriately grasping a wear degree of a vehicle part.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described.

Figure 1:
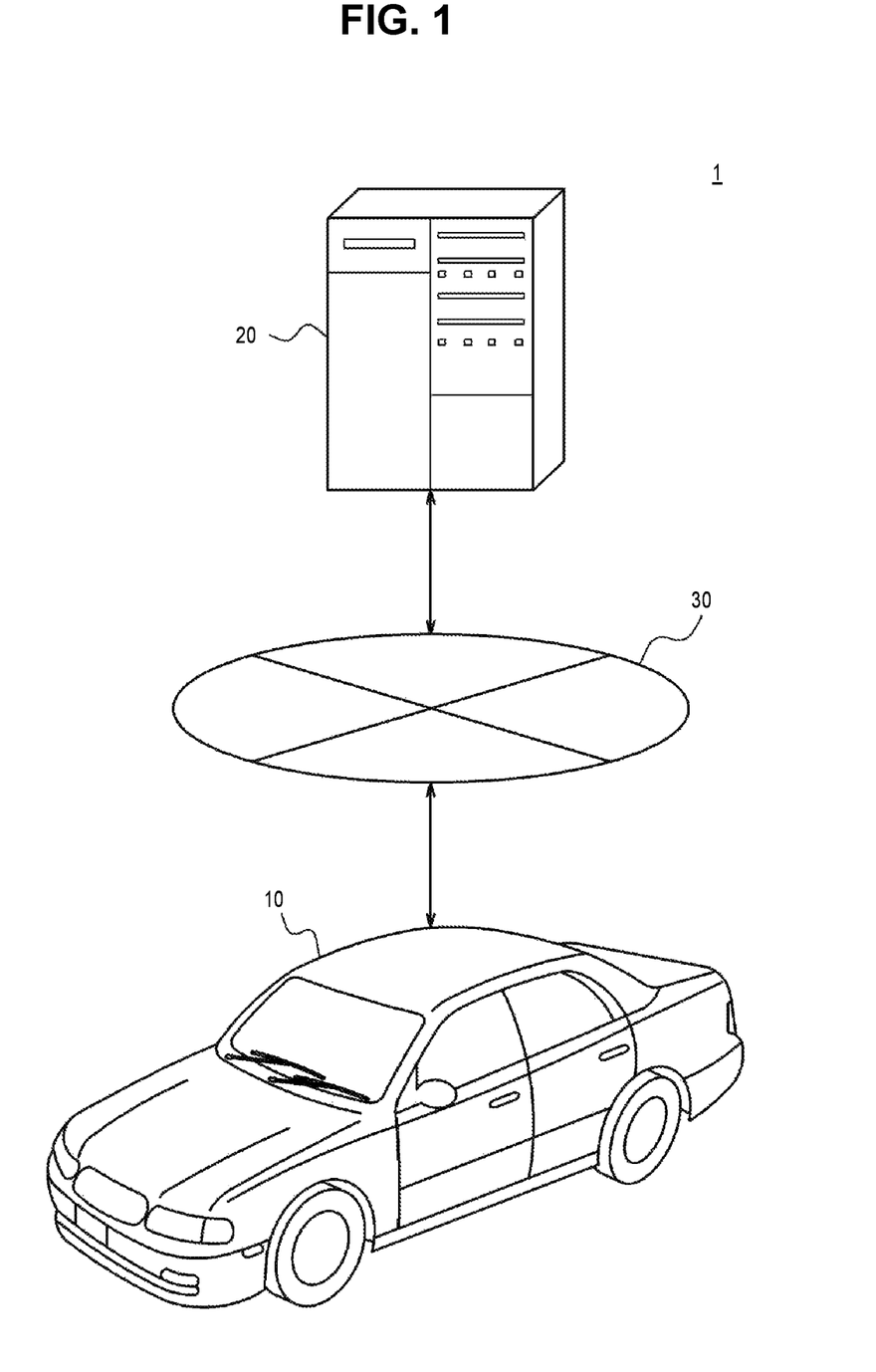
FIG. 1 is a block diagram illustrating a schematic configuration of a system according to an embodiment of the present disclosure.

With reference to FIG. 1, an overview of a system 1 according to an embodiment of the present disclosure will be described.

The system 1 includes a vehicle 10 and an information processing apparatus 20. The vehicle 10 and the information processing apparatus 20 are communicably connected to a network 30.

The vehicle 10 may be, for example, an automobile, but is not limited thereto and may be any vehicle. The automobile may be, for example, a gasoline-powered vehicle, a battery electric vehicle, a hybrid electric vehicle, a plug-in hybrid electric vehicle, or a fuel cell electric vehicle, but is not limited thereto. The vehicle 10 may be driven by a driver or driven at any level of automation. The level of automation may be, for example, one of Level 1 to Level 5 classified by the Society of Automotive Engineers (SAE) leveling. The vehicle 10 may be a vehicle dedicated to Mobility-as-a-Service (MaaS).

The information processing apparatus 20 may be a computer, such as a server belonging to a cloud computing system or another computing system.

The network 30 includes the Internet, at least one wide area network (WAN), at least one metropolitan area network (MAN), or any combination thereof. The network 30 may include at least one wireless network, at least one optical network, or any combination thereof. An example of the wireless network includes an ad hoc network, a cellular network, a wireless local area network (LAN), a satellite communication network, or a terrestrial microwave network.

With reference to FIG. 1, an overview of the present embodiment will be described.

A control unit 21 of the information processing apparatus 20 acquires the number of times of operations or an operation time of an operation unit 14 provided in the vehicle at a time at which the operation unit 14 10 has operated. Further, the control unit 21 of the information processing apparatus 20 acquires surroundings information around the vehicle 10 at the time at which the operation unit 14 has operated. Further, the control unit 21 of the information processing apparatus 20 calculates a wear degree of the operation unit 14 by multiplying a wear coefficient which corresponds to surroundings indicated by the acquired surroundings information by the acquired number of times of operations or operation time.

As described above, with the present embodiment, in calculating the wear degree of the operation unit 14 provided in the vehicle 10, a wear coefficient according to the surroundings around the vehicle 10 is taken into consideration in addition to the number of times of operation or the operation time of the operation unit 14. Therefore, it is possible to improve the technique for appropriately grasping the wear degree of the vehicle part. As such, it is possible to recommend replacement or maintenance of a vehicle part at an appropriate time.

Figure 2:
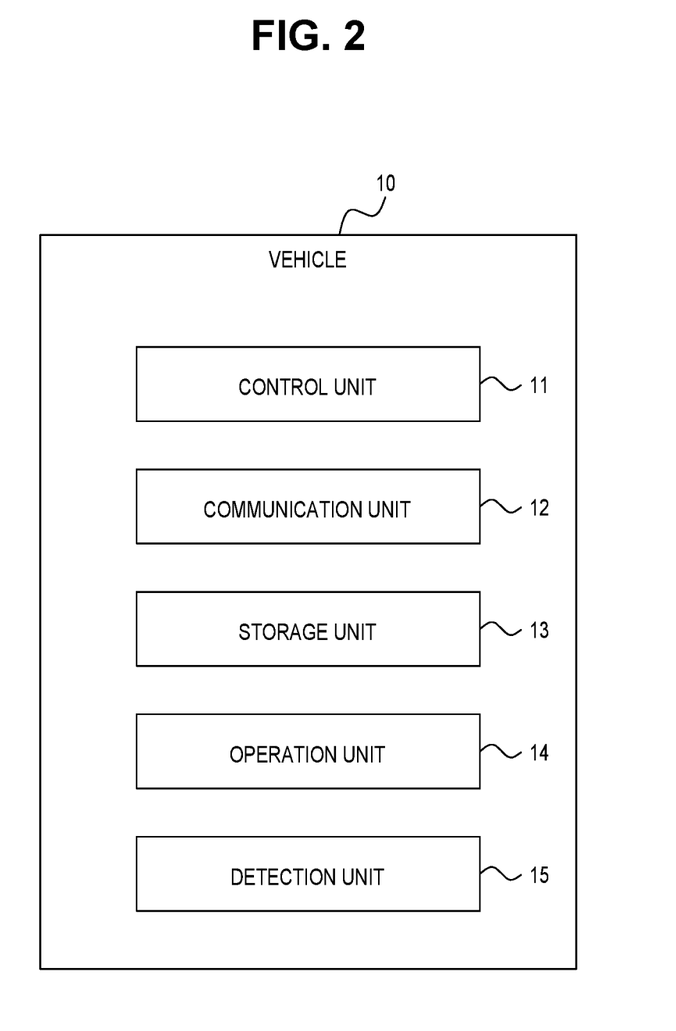
FIG. 2 is a block diagram illustrating a schematic configuration of a vehicle according to an embodiment of the present disclosure.

With reference to FIG. 2, a configuration of the vehicle 10 according to the present embodiment will be described.

The vehicle 10 includes a control unit 11, a communication unit 12, a storage unit 13, the operation unit 14, and a detection unit 15.

The control unit 11 includes one or more processors, one or more programmable circuits, one or more dedicated circuits, or a combination thereof. An example of the processor includes a general-purpose processor, such as a central processing unit (CPU) or a graphics processing unit (GPU), or a dedicated processor specialized for a specific process, but is not limited thereto. An example of the programmable circuit includes a field-programmable gate array (FPGA), but is not limited thereto. An example of the dedicated circuit includes an application specific integrated circuit (ASIC), but is not limited thereto. The control unit 11 executes processing on an operation of the vehicle 10 while controlling each unit of the vehicle 10. Further, the control unit 11 measures the number of times of operations or the operation time of the operation unit 14.

The communication unit 12 includes at least one communication interface. The communication interface may be an interface corresponding to a mobile communication standard, such as Fourth Generation (4G) or Fifth Generation (5G). For example, an in-vehicle communication device, such as a data communication module (DCM), may function as the communication unit 12. The communication unit 12 receives data used for the operation of the vehicle 10 and transmits data obtained by the operation of the vehicle 10.

The storage unit 13 includes at least one semiconductor memory, at least one magnetic memory, at least one optical memory, or any combination thereof. An example of the semiconductor memory includes a random access memory (RAM) or a read-only memory (ROM). An example of the RAM includes a static random access memory (SRAM) or a dynamic random access memory (DRAM). An example of the ROM includes an electrically erasable programmable read-only memory (EEPROM). The storage unit 13 functions as, for example, a primary storage device, a secondary storage device, or a cache memory. The storage unit 13 stores data used for the operation of the vehicle 10 and data obtained by the operation of the vehicle 10. The data used for the operation of the vehicle 10 includes a system program, an application program, a database, and the like.

The operation unit 14 includes a vehicle part provided in the vehicle 10. The vehicle part may be a main part having an electric control unit (ECU), or may be a component part having no ECU. An example of the operation unit 14 includes a wiper, an in-vehicle camera, a tire, a hybrid control ECU, or a brake.

The detection unit 15 includes at least one global navigation satellite system (GNSS) receiver. An example of the GNSS includes the Global Positioning System (GPS), the Quasi-Zenith Satellite System (QZSS), the BeiDou™ Navigation Satellite System (BDS), a Global Navigation Satellite System (GLONASS), or Galileo. The detection unit 15 detects a position of the vehicle 10.

Figure 3:
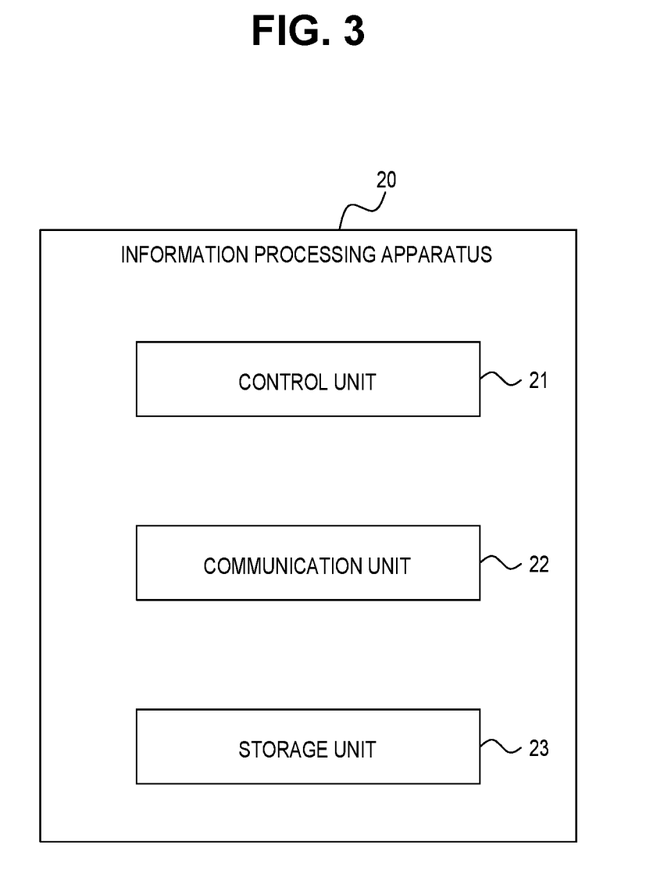
FIG. 3 is a block diagram illustrating a schematic configuration of an information processing apparatus according to an embodiment of the present disclosure.

With reference to FIG. 3, a configuration of the information processing apparatus 20 according to the present embodiment will be described.

The information processing apparatus 20 includes the control unit 21, a communication unit 22, and a storage unit 23.

The control unit 21 includes at least one processor, at least one programmable circuit, at least one dedicated circuit, or any combination thereof. An example of the processor includes a general-purpose processor, such as a CPU or a GPU, or a dedicated processor specialized for a specific process, but is not limited thereto. An example of the programmable circuit includes an FPGA, but is not limited thereto. An example of the dedicated circuit includes an ASIC, but is not limited thereto. The control unit 21 executes processing on an operation of the information processing apparatus 20 while controlling each unit of the information processing apparatus 20.

The communication unit 22 includes at least one communication interface. The communication interface corresponds to, for example, a mobile communication standard, a wired LAN standard, or a wireless LAN standard, but is not limited thereto, and may correspond to any communication standard. The communication unit 22 receives data used for the operation of the information processing apparatus 20 and transmits data obtained by the operation of the information processing apparatus 20.

The storage unit 23 includes at least one semiconductor memory, at least one magnetic memory, at least one optical memory, or any combination thereof. An example of the semiconductor memory includes a RAM or a ROM. An example of the RAM includes an SRAM or a DRAM. An example of the ROM includes an EEPROM. The storage unit 23 functions as, for example, a primary storage device, a secondary storage device, or a cache memory. The storage unit 23 stores the data used for the operation of the information processing apparatus 20 and the data obtained by the operation of the information processing apparatus 20. In the present embodiment, the data used for the operation of the information processing apparatus 20 includes a system program, an application program, a database, and the like.

Figure 4:
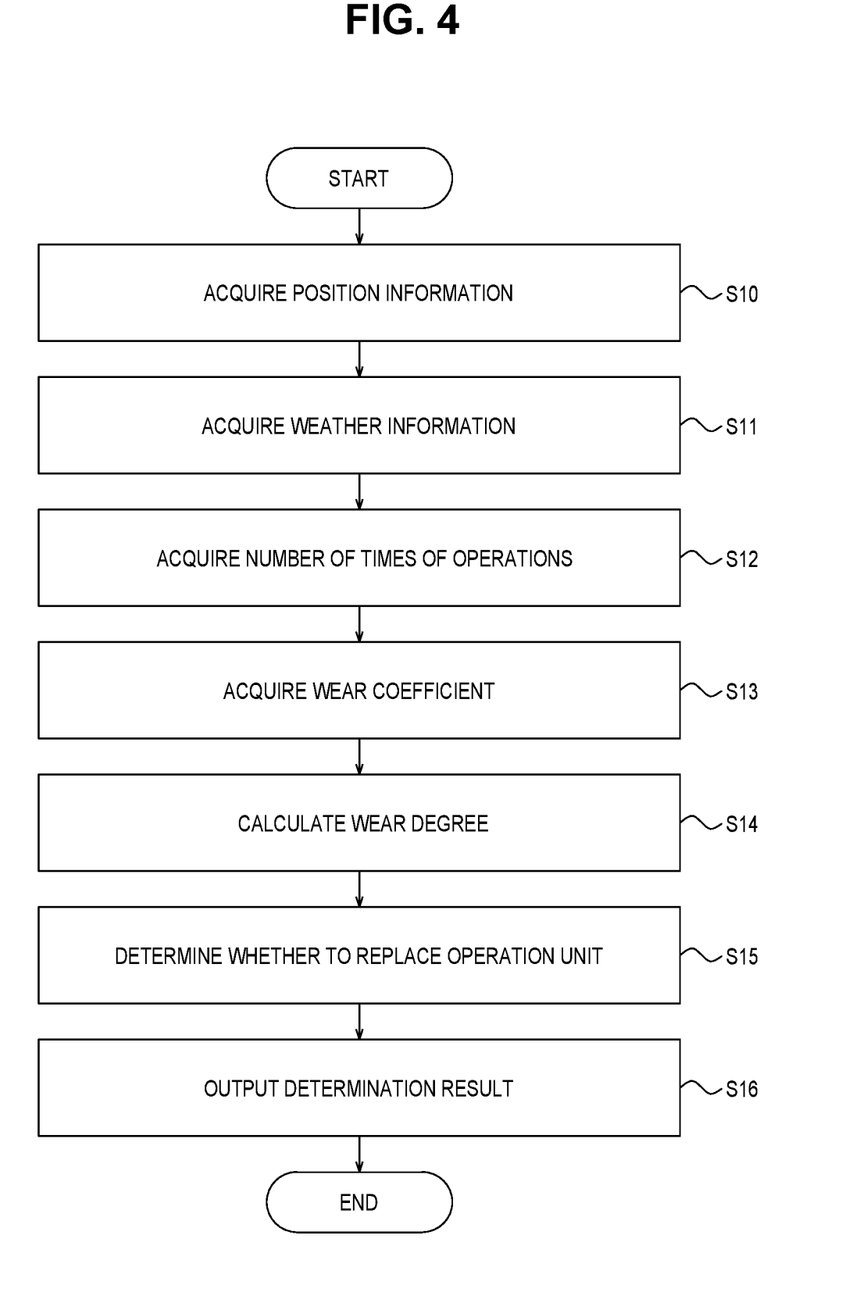
FIG. 4 is a flowchart illustrating an operation example 1 of the information processing apparatus according to an embodiment of the present disclosure.

With reference to FIG. 4, an operation example 1 of the information processing apparatus 20 according to the present embodiment will be described.

In this example, it is described that the weather around the vehicle 10 changes from sunny weather to rainy or snowy weather during one trip of the vehicle 10, and a wiper corresponding to the operation unit 14 operates. However, the present disclosure is not limited thereto. For example, the operation unit 14 may be an in-vehicle camera or a tire. The one trip of the vehicle 10 means a traveling movement of the vehicle 10 from a time at which an ignition switch or a power switch of the vehicle 10 is turned on to a time at which it is turned off.

Step S10: The control unit 21 of the information processing apparatus 20 acquires position information of the vehicle 10 at the time at which the operation unit 14 provided in the vehicle 10 has operated.

Specifically, upon sensing the operation of the operation unit 14 provided in the vehicle 10, the control unit 11 of the vehicle 10 acquires the position information of the vehicle 10 via the detection unit 15. Next, the control unit 11 of the vehicle 10 transmits the acquired position information of the vehicle 10 to the information processing apparatus 20 via the communication unit 12. Next, the control unit 21 of the information processing apparatus 20 acquires the position information of the vehicle 10 from the vehicle 10 via the communication unit 22. Next, the control unit 21 of the information processing apparatus 20 stores the acquired position information of the vehicle 10 in the storage unit 23.

Step S11: The control unit 21 of the information processing apparatus 20 acquires weather information at a position indicated by the position information, acquired in step S10, of the vehicle 10. The weather information corresponds to the surroundings information around the vehicle 10 at the time at which the operation unit 14 provided in the vehicle 10 has operated.

Specifically, the control unit 21 of the information processing apparatus 20 acquires the weather information at the position indicated by the position information, acquired in step S10, of the vehicle 10 from a server or the like of a business operator who offers the weather information via the communication unit 22. For example, the control unit 21 of the information processing apparatus 20 associates the position information of the vehicle 10 and the weather information by acquiring the weather information at a plurality of points provided at predetermined intervals on a traveling route in one trip of the vehicle 10. Next, the control unit 21 of the information processing apparatus 20 stores the acquired weather information in the storage unit 23.

Step S12: The control unit 21 of the information processing apparatus 20 acquires the number of times of operations of the operation unit 14 at the time at which the operation unit 14 provided in the vehicle 10 has operated. The operation time may be acquired instead of the number of times of operation.

Specifically, upon sensing the operation of the operation unit 14 provided in the vehicle 10, the control unit 11 of the vehicle 10 measures the number of times of operations of the operation unit 14. Next, the control unit 11 of the vehicle 10 associates the position information, acquired in step S10, of the vehicle 10 with the measured number of times of operation of the operation unit 14, and transmits it to the information processing apparatus 20 via the communication unit 12. Next, the control unit 21 of the information processing apparatus 20 acquires, from the vehicle 10 via the communication unit 22, the position information, acquired in step S10, of the vehicle 10 and the number of times of operation of the operation unit 14 associated with the position information. Here, the control unit 21 of the information processing apparatus 20 may specify, based on the weather information, acquired in step S11, corresponding to the surroundings information, the number of times of operations (hereinafter, referred to as "the number of times of operations in the rainy or the snowy weather") of the operation unit 14 in the rainy or the snowy weather and the number of times of operations (hereinafter, referred to as "the number of times of operations in the sunny weather") of the operation unit 14 in the sunny weather from among the number of times of operations of the operation unit 14 acquired by the above method.

The control unit 21 of the information processing apparatus 20 executes the above-described processes of steps S10 to S12 at a predetermined timing. An example of the predetermined timing may be the end of one trip of the vehicle 10 or once a day, but is not limited thereto.

Step S13: The control unit 21 of the information processing apparatus 20 acquires a wear coefficient which corresponds to the weather indicated by the weather information, acquired in step S11, corresponding to the surroundings information.

Specifically, the storage unit 23 of the information processing apparatus 20 stores in advance wear coefficients which correspond to any weather conditions, respectively. The control unit 21 of the information processing apparatus 20 acquires the wear coefficient which corresponds to the weather indicated by the weather information acquired in step S11, from among the wear coefficients which correspond to any weather conditions, stored in the storage unit 23, respectively. For example, the storage unit 23 of the information processing apparatus 20 stores in advance a wear coefficient (hereinafter, referred to as a "wear coefficient in the rainy or the snowy weather") multiplied by the number of times of operations in the rainy or the snowy weather, and a wear coefficient (hereinafter, referred to as a "wear coefficient in the sunny weather") multiplied by the number of times of operations in the sunny weather. Here, a value of the wear coefficient in the rainy or the snowy weather may be higher than a value of the wear coefficient in the sunny weather. For example, the value of the wear coefficient in the rainy or the snowy weather may be "2". Further, for example, the value of the wear coefficient in the sunny weather may be "1". This is because the wiper corresponding to the operation unit 14 is heavily worn in an area in which it rains or snows a lot, and it is recommended that maintenance be executed in a cycle of approximately half the cycle that maintenance is executed in an area in which it is mostly sunny.

Step S14: The control unit 21 of the information processing apparatus 20 calculates the wear degree of the operation unit 14 by multiplying the wear coefficient acquired in step S13 by the number of times of operations acquired in step S12.

Specifically, the control unit 21 of the information processing apparatus 20 calculates the wear degree using the following equation (1). The wear degree may be a cumulative value of a wear degree calculated in each trip.

[Formula 1]

$$\text{Wear degree} = [\text{wear coefficient in rainy or snowy weather}] \times [\text{number of times of operations in rainy or snowy weather}] + [\text{wear coefficient in sunny weather}] \times [\text{number of times of operation in sunny weather}] \quad (1)$$

Step S15: The control unit 21 of the information processing apparatus 20 determines whether to replace the operation unit 14 based on a comparison between the wear degree calculated in step S14 and a predetermined threshold value.

Specifically, when the wear degree calculated in step S14 exceeds the predetermined threshold value, the control unit 21 of the information processing apparatus 20 determines to replace the operation unit 14. The predetermined threshold value may be set in advance by any method and stored in advance in the storage unit 23 such that the control unit 21 of the information processing apparatus 20 can refer to it when executing this step.

Step S16: The control unit 21 of the information processing apparatus 20 outputs a determination result of step S15.

Specifically, upon determining to replace the operation unit 14 in step S15, the control unit 21 of the information processing apparatus 20 notifies the vehicle 10 or any user terminal of the determination result via the communication unit 22. As such, it is possible to notify the user of an appropriate replacement time of the wiper corresponding to the operation unit 14 in, for example, the area in which it rains or snows a lot.

Figure 5:
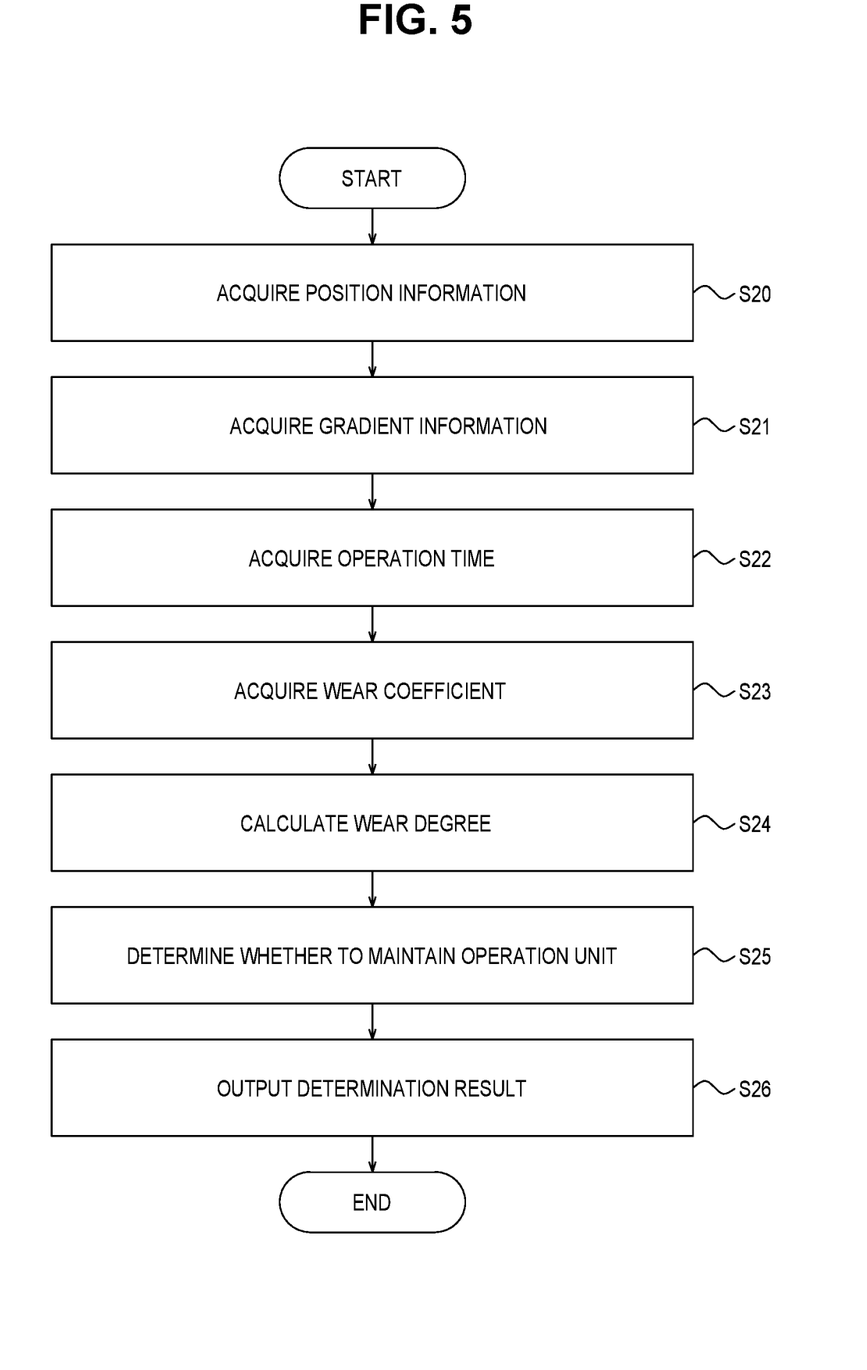
FIG. 5 is a flowchart illustrating an operation example 2 of the information processing apparatus according to an embodiment of the present disclosure.

With reference to FIG. 5, an operation example 2 of the information processing apparatus 20 according to the present embodiment will be described.

In this example, it is described that the vehicle 10 travels on a flat ground and on a slope during one trip of a hybrid electric vehicle corresponding to the vehicle 10. Further, in this example, it is described that the operation unit 14 is a hybrid control ECU. However, the present disclosure is not limited thereto. For example, the vehicle 10 may be a vehicle other than a hybrid electric vehicle. Further, the operation unit 14 may be, for example, a brake or a tire. The slope may be defined as, for example, an uphill or downhill vehicle road having a gradient equal to or higher than 4 degrees. Further, the flat ground may be defined as, for example, a vehicle road having a gradient lower than 4 degrees.

Step S20: The control unit 21 of the information processing apparatus 20 acquires the position information of the vehicle 10 at the time at which the operation unit 14 provided in the vehicle 10 has operated.

Specifically, upon sensing the operation of the operation unit 14 provided in the vehicle 10, the control unit 11 of the vehicle 10 acquires the position information of the vehicle 10 via the detection unit 15. Next, the control unit 11 of the vehicle 10 transmits the acquired position information of the vehicle 10 to the information processing apparatus 20 via the communication unit 12. Next, the control unit 21 of the information processing apparatus 20 acquires the position information of the vehicle 10 from the vehicle 10 via the communication unit 22. Next, the control unit 21 of the information processing apparatus 20 stores the acquired position information of the vehicle 10 in the storage unit 23.

Step S21: The control unit 21 of the information processing apparatus 20 acquires gradient information at a position indicated by the position information, acquired in step S20, of the vehicle 10. The gradient information corresponds to the surroundings information around the vehicle 10 at the time at which the operation unit 14 provided in the vehicle 10 has operated.

Specifically, the control unit 21 of the information processing apparatus 20 specifies the traveling route of the vehicle 10 by analyzing a temporal transition of the position indicated by the position information, acquired in step S20, of the vehicle 10. Next, the control unit 21 of the information processing apparatus 20 acquires altitude information indicating altitudes of any two points on the specified traveling route, from a server or the like of a business operator who offers three-dimensional map information via the communication unit 22. Next, the control unit 21 of the information processing apparatus 20 calculates a gradient between any two points (for example, a predetermined minute section) on the traveling route from the acquired altitude information. Next, the control unit 21 of the information processing apparatus 20 stores, in the storage unit 23, the gradient information indicated by the calculated gradient.

Step S22: The control unit 21 of the information processing apparatus 20 acquires the operation time of the operation unit 14 at the time at which the operation unit 14 provided in the vehicle 10 has operated. The number of times of operations may be acquired instead of the operation time.

Specifically, upon sensing the operation of the operation unit 14 provided in the vehicle 10, the control unit 11 of the vehicle 10 measures the operation time of the operation unit 14. Next, the control unit 11 of the vehicle 10 associates the position information, acquired in step S20, of the vehicle 10 with the measured operation time of the operation unit 14, and transmits it to the information processing apparatus 20 via the communication unit 12. Next, the control unit 21 of the information processing apparatus 20 acquires, from the vehicle 10 via the communication unit 22, the position information, acquired in step S20, of the vehicle 10 and the operation time of the operation unit 14 associated with the position information. Here, the control unit 21 of the information processing apparatus 20 may specify, based on the gradient information, acquired in step S21, corresponding to the surroundings information, the operation time (hereinafter, referred to as an "operation time on the slope") of the operation unit 14 on the traveling route of the vehicle 10 having a gradient equal to or higher than a predetermined value and the operation time (hereinafter, referred to as an "operation time on the flat ground") of the operation unit 14 on the traveling route of the vehicle 10 having a gradient lower than the predetermined value from among the operation time of the operation unit 14 acquired by the above method.

The control unit 21 of the information processing apparatus 20 executes the above-described processes of steps S20 to S22 at a predetermined timing. An example of the predetermined timing may be the end of one trip of the vehicle 10 or once a day, but is not limited thereto.

Step S23: The control unit 21 of the information processing apparatus 20 acquires a wear coefficient which corresponds to the gradient indicated by the gradient information, acquired in step S21, corresponding to the surroundings information.

Specifically, the storage unit 23 of the information processing apparatus 20 stores in advance wear coefficients which correspond to any gradients, respectively. The control unit 21 of the information processing apparatus 20 acquires the wear coefficient which corresponds to the gradient indicated by the gradient information acquired in step S21, from among the wear coefficients which correspond to any gradients, stored in the storage unit 23, respectively. For example, the storage unit 23 of the information processing apparatus 20 stores in advance a wear coefficient (hereinafter, referred to as a "wear coefficient on the slope") multiplied by the operation time on the traveling route of the vehicle 10 having a gradient equal to or higher than the predetermined value, and a wear coefficient (hereinafter, referred to as a "wear coefficient on the flat ground") multiplied by the operation time on the traveling route of the vehicle 10 having a gradient lower than the predetermined value. Here, a value of the wear coefficient on the slope may be higher than a value of the wear coefficient on the flat ground. For example, the value of the wear coefficient on the slope may be "2". Further, for example, the value of the wear coefficient on the flat ground may be "1". This is because, for example, in a hybrid electric vehicle, the hybrid control ECU tends to be more remarkably worn on the slope than on the flat ground.

Step S24: The control unit 21 of the information processing apparatus 20 calculates the wear degree of the operation unit 14 by multiplying the wear coefficient acquired in step S23 by the operation time acquired in step S22.

Specifically, the control unit 21 of the information processing apparatus 20 calculates the wear degree by the following equation (2). The wear degree may be a cumulative value of a wear degree calculated in each trip.

[Formula 2]

$$\text{Wear degree} = [\text{wear coefficient on slope}] \times [\text{operation time on slope}] + [\text{wear coefficient on flat ground}] \times [\text{operation time on flat ground}] \quad (2)$$

Step S25: The control unit 21 of the information processing apparatus 20 determines whether to maintain the operation unit 14 based on a comparison between the wear degree calculated in step S24 and a predetermined threshold value.

Specifically, when the wear degree calculated in step S24 exceeds the predetermined threshold value, the control unit 21 of the information processing apparatus 20 determines to maintain the operation unit 14. The predetermined threshold value may be set in advance by any method and stored in advance in the storage unit 23 such that the control unit 21 of the information processing apparatus 20 can refer to it when executing this step.

Step S26: The control unit 21 of the information processing apparatus 20 outputs a determination result of step S25.

Specifically, upon determining to maintain the operation unit 14 in step S25, the control unit 21 of the information processing apparatus 20 notifies the vehicle 10 or any user terminal of the determination result via the communication unit 22. As such, it is possible to notify the user of an appropriate maintenance time of, for example, a hybrid electric vehicle used in an area with many slopes.

As described above, the control unit 21 of the information processing apparatus 20 according to the present embodiment acquires the number of times of operations or the operation time of the operation unit 14 provided in the vehicle 10 at the time at which the operation unit 14 has operated. Further, the control unit 21 of the information processing apparatus 20 acquires surroundings information around the vehicle 10 at the time at which the operation unit 14 has operated. Further, the control unit 21 of the information processing apparatus 20 calculates the wear degree of the operation unit 14 by multiplying a wear coefficient which corresponds to surroundings indicated by the acquired surroundings information by the acquired number of times of operations or operation time.

With the above configuration, in calculating the wear degree of the operation unit 14 provided in the vehicle 10, the wear coefficient according to the surroundings around the vehicle 10 is taken into consideration in addition to the number of times of operation or the operation time of the operation unit 14. Therefore, it is possible to improve the technique for appropriately grasping the wear degree of the vehicle part. As such, it is possible to recommend replacement or maintenance of the vehicle part at an appropriate time.

Although the present disclosure has been described based on the drawings and examples, it should be noted that those skilled in the art may make various modifications and variations based on the present disclosure. It should be noted, therefore, that these modifications and variations are within the scope of the present disclosure. For example, the functions and the like included in each element, each step, or the like can be rearranged so as not to be logically contradictory, and a plurality of elements, steps, operation examples, or the like can be combined into one or divided.

As a modified example, an embodiment in which the configuration and the operation of the information processing apparatus 20 are distributed to a plurality of computers capable of communicating with each other is also possible. Further, for example, an embodiment in which a part or all the components of the information processing apparatus 20 are provided in the vehicle 10 is also possible.

As a modified example, instead of step S15 or S25 described above, the control unit 21 of the information processing apparatus 20 may infer a replacement time or a maintenance time of the operation unit 14 based on the method of accumulating the wear degree calculated in step S14 or S24. For example, upon inferring that the wear degree between a vehicle inspection next time and a vehicle inspection subsequently after the next time exceeds a predetermined threshold value based on how much the wear degree between a vehicle inspection subsequently before the last time and a vehicle inspection last time has increased, and a current wear degree, the control unit 21 of the information processing apparatus 20 may determine to replace or maintain the operation unit 14 at the next vehicle inspection.

As a modified example, instead of steps S15 and S16, or steps S25 and S26 described above, the control unit 21 of the information processing apparatus 20 may output the wear degree calculated in step S14 or S24.

As a modified example, the control unit 21 of the information processing apparatus 20 may calculate the wear coefficient based on a type of the vehicle 10 or a driving skill or a driving habit of a driver. For example, the control unit 21 of the information processing apparatus 20 learns a correspondence between the type of vehicle 10 or the driving skill or the driving habit of the driver, and a replacement frequency or a maintenance frequency of the operation unit 14, using any machine learning technique. Next, the control unit 21 of the information processing apparatus 20 calculates the wear coefficient according to the type of the vehicle 10, or the driving skill or the driving habit of the driver, based on a learning result. For example, with respect to a tire or a brake corresponding to the operation unit 14, a heavy vehicle 10, a vehicle 10 of a driver with a poor driving skill, or a vehicle 10 of a driver with a high frequency of sudden braking tends to have a higher replacement frequency or maintenance frequency than a light vehicle 10, a vehicle 10 of a driver with a high driving skill, or a vehicle 10 of a driver with a low frequency of sudden braking, and thus a higher wear coefficient is set to the former case than the latter case. Next, the control unit 21 of the information processing apparatus 20 stores, in the storage unit 23, the calculated wear coefficient. As such, the wear coefficient is customized according to the type of the vehicle or the driving skill or the driving habit of the driver.

As a modified example, an embodiment in which a general-purpose computer functions as the information processing apparatus 20 according to the above-described embodiment is also possible. Specifically, a program describing processing contents that implements each function of the information processing apparatus 20 according to the above-described embodiment is stored in a memory of the general-purpose computer, and the program is read and executed by a processor. Therefore, the disclosure according to the present embodiment can also be implemented as a program that can be executed by a processor or a non-transitory computer-readable medium storing the program. The non-transitory computer-readable medium is an example of a storage medium.

What is claimed is:
1. An information processing system comprising:
a vehicle including a first processor, a first memory, and an actuator; and a server including a second processor and a second memory, wherein the vehicle is configured to
- receive position information of the vehicle via a global navigation satellite system (GNSS) receiver,
- record the number of operations or an operation duration of the actuator during a trip in the first memory, the trip being a movement of the vehicle started at a time when an ignition or power switch of the vehicle is turned on and completed at a time when the ignition or power switch is turned off subsequently, and
- transmit the position information associated with the number of operations or the operation duration to the server in response to completion of the trip, and the server is configured to
- receive the position information, and the number of operations or the operation duration, from the vehicle,
- receive surroundings information around the vehicle when the actuator operates, from a second server based on the position information,
- calculate a wear degree of the actuator by multiplying the number of operations or the operation duration by a wear coefficient which corresponds to surroundings indicated by the received surroundings information,
- calculate a total wear degree that is a cumulative value of the wear degree calculated for each trip in the past,
- determine whether the total wear degree exceeds a predetermined threshold value, and
- send a maintenance notification to a user terminal in response to the determination that the wear degree exceeds the predetermined threshold value.

2. The information processing system according to claim 1, wherein the surroundings information includes weather information indicating weather at a position indicated by position information of the vehicle.

3. The information processing system according to claim 2, wherein:
the server is configured to use the weather information to specify the number of operations or the operation duration under rainy weather or snowy weather and the number of operations or the operation duration under sunny weather, from among the recorded number of operations or the recorded operation duration; and
a value of the wear coefficient multiplied by the number of operations or the operation duration under the rainy weather or the snowy weather is higher than a value of the wear coefficient multiplied by the number of operations or the operation duration under the sunny weather.

4. The information processing system according to claim 1, wherein the surroundings information includes gradient information indicating a gradient of a road at a position indicated by position information of the vehicle.

5. The information processing system according to claim 4, wherein:
the server is configured to use the gradient information to specify the number of operations or the operation duration on a traveling route of the vehicle having a first gradient equal to or higher than a predetermined value and the number of operations or the operation duration on a traveling route of the vehicle having a second gradient lower than the predetermined value, from among the recorded number of operations or the recorded operation duration; and
a value of the wear coefficient multiplied by the number of operations or the operation duration on the traveling route having the first gradient is higher than a value of the wear coefficient multiplied by the number of operations or the operation duration on the traveling route having the second gradient.

6. The information processing system according to claim 1, wherein the server is configured to calculate the wear coefficient based on a type of the vehicle, or a level of driving skill or a driving habit of a driver.

7. A method executed by an information processing system including a vehicle and a server, the vehicle including a first processor, a first memory, and an actuator; and the server including a second processor and a second memory, the method comprising:
- receiving, by the vehicle, position information of the vehicle via a global navigation satellite system (GNSS) receiver;
- recording, by the vehicle, the number of operations or an operation duration of the actuator during a trip in the first memory, the trip being a movement of the vehicle started at a time when an ignition or power switch of the vehicle is turned on and completed at a time when the ignition or power switch is turned off subsequently;
- transmitting, by the vehicle, the position information associated with the number of operations or the operation duration to the server in response to completion of the trip;
- receiving, by the server, the position information, and the number of operations or the operation duration, from the vehicle;
- receiving, by the server, surroundings information around the vehicle when the actuator operates, from a second server based on the position information;
- calculating, by the server, a wear degree of the actuator by multiplying the number of operations or the operation duration by a wear coefficient which corresponds to surroundings indicated by the received surroundings information;
- calculating, by the server, a total wear degree that is a cumulative value of the wear degree calculated for each trip in the past;
- determining, by the server, whether the total wear degree exceeds a predetermined threshold value; and
- sending, by the server, a maintenance notification to a user terminal in response to the determination that the wear degree exceeds the predetermined threshold value.

8. The method according to claim 7, wherein the surroundings information includes weather information indicating weather at a position indicated by position information of the vehicle.

9. The method according to claim 8, further comprising using, by the server, the weather information to specify the number of operations or the operation duration under rainy weather or snowy weather and the number of operations or the operation duration under sunny weather, from among the recorded number of operations or the recorded operation duration,
wherein a value of the wear coefficient multiplied by the number of operations or the operation duration under the rainy weather or the snowy weather is higher than a value of the wear coefficient multiplied by the number of operations or the operation duration under the sunny weather.

10. The method according to claim 7, wherein the surroundings information includes gradient information indicating a gradient of a road at a position indicated by position information of the vehicle.

11. The method according to claim 10, further comprising using, by the server, the gradient information to specify the number of operations or the operation duration on a traveling route of the vehicle having a first gradient equal to or higher than a predetermined value, and the number of operations or the operation duration on a traveling route of the vehicle having a second gradient lower than the predetermined value, from among the recorded number of operations or the recorded operation duration
   wherein a value of the wear coefficient multiplied by the number of operations or the operation duration on the traveling route having the first gradient is higher than a value of the wear coefficient multiplied by the number of operations or the operation duration on the traveling route having the second gradient.

12. The method according to claim 7, further comprising calculating, by the server, the wear coefficient based on a type of the vehicle, or a level of driving skill or a driving habit of a driver.

* * * * *